2,881,089

MIRROR COATING ALLOY

William C. Herrmann, Jr., Houston, Tex., assignor to Texas Instruments Incorporated, Dallas, Tex., a corporation of Delaware No Drawing. Application February 2, 1955
Serial No. 485,800

2 Claims. (Cl. 117—35)

This invention relates to reflective coatings for optical elements and more specifically to aluminum alloy reflective coatings providing hard, durable and abrasion resistant coatings with high light reflective efficiencies. The alloy of this invention has particular application to the reflective coating on "first" or front surface coated mirrors.

For many applications such as recording oscillographs and mass spectrometers which require a high degree of accuracy, the secondary reflections or images of back surface coated mirrors are very undesirable. Secondary reflections are produced in back surface coated mirrors for the reason that light falling on the front surface is partially reflected and partially refracted. The reflected portion of the light produces the first image of the series while the refracted portion reflects from the mirrored surface and, on returning to the front surface, partially refracts back into the first light path medium thereby producing the second image of the series. The portion of the light not refracted into the first medium is reflected back to the mirrored surface to be again reflected to the front surface and so on, thus giving rise to a series of images. Of any such series of images, however, it should be recognized that the first two are probably the only images of consequence in the secondary reflection problem.

To avoid then the secondary reflections inherent in back surface coated mirrors, resort was had to coating optical elements or mirrors on their front surface. The material generally chosen for this reflective coating was aluminum because, first, it reflects light at a relatively high efficiency, the luminous reflectivity being in the order of 87% to 89% over the visible spectrum range of light wave lengths. The second reason was that, although silver has a higher luminous reflectivity than aluminum over the entire visible spectrum range of light wave lengths, silver tarnishes very rapidly when exposed to ordinary atmospheres while aluminum resists oxidation and tarnish very well. Even with these advantages, such aluminum reflection coatings were not altogether satisfactory because they were comparatively soft and offered a very low resistance to abrasion. Thus, when it was necessary to clean one of these coatings, it was found that, although the softest of materials were used, the surface would suffer numerous hairline scratches and even have portions of the coating removed in the cleaning process.

In the prior art, many attempts have been made to overcome the disadvantages of aluminum used as a front surface reflective coating. One of these was to alloy magnesium in with the aluminum. The use of the magnesium-aluminum alloy produced a coating which was somewhat harder than the aluminum alone so that if great care was taken in cleaning the reflecting surface, no apparent damage resulted. However, this alloy coating could take but very little abuse and was still unsuitable for use in instruments such as the recording oscillograph when the instrument was used in the field. Another attempt to overcome the disadvantages of the aluminum front surface coating consisted of a process wherein a first aluminum coating was evaporated onto a mirror or other suitable blank and any discontinuities in this first coating developed and accentuated. Then, a second coating of aluminum was evaporated onto the surface of the mirror thereby producing a longer lasting surface free of discontinuities. This coating, too, being formed solely of aluminum, was still soft and able to withstand but little abuse. Next, an overcoating comprised of some suitable substance such as magnesium flouride was applied to the aluminum surface to provide a hard, abrasion-resistant and corrosion-resistant protective covering for the aluminum surface. Such an overcoating was far superior to the aluminum coating alone or any of the prior art attempts to provide a durable front coating reflecting surface but this coating has the disadvantage that, if a break or crack forms, the entire coating breaks down and the coating itself acts as an abrasive to further remove the overcoating. Further, two separate coating steps are required to produce a functional front surface mirror by the overcoating process.

The present invention constitutes an improvement over the prior art in that a very hard, durable, and abrasion-resistant coating is provided for front surface mirrors in a single step operation. Essentially, this invention consists of producing an alloy of aluminum and beryllium and evaporating this alloy onto the surface of the mirror blank to be coated. The aluminum in the alloy provides the required high efficiency reflective coating while the beryllium in the alloy provides the hardness which is lacking in the aluminum coating when used alone for the reflecting surface and which was not provided by any of the prior art means for overcoming the disadvantages to the use of aluminum as a front surface reflective coating.

Accordingly, it is the principal object of this invention to produce a functional mirror after abuse that would destroy the usefulness of any other mirror.

Specifically, it is an object of this invention to produce a very hard, durable and abrasion-resistant front surface mirror coating which can be cleaned without destroying its reflecting qualities.

Another object of this invention is to alloy beryllium with aluminum within the ranges which will provide the hard, durable and abrasion-resistant coating of this invention and yet not impair the reflecting qualities of the aluminum.

The above objects will be clarified and other objects made known as the description proceeds.

The optical elements, hereinafter referred to as mirror blanks, which are to be provided with the coating of this invention may have any one of a number of different shapes, such as square, rectangular, circular, elliptical or otherwise. The size of these mirror blanks is not critical in this invention but is limited only by the size of the equipment available for producing the coating. The contour of the mirror blank surface is also not limited since, in the practice of this invention, it is common to produce coatings on flat surfaces as well as convex and concave surfaces. Furthermore, the coating is not necessarily limited in its application to a glass surface as the mirror blank but may be applied as well to quartz, metals and other substances.

In order to provide a reflective surface which adheres tenaciously to the surface of the mirror blank, it has been found necessary to thoroughly clean the surface and remove all dirt, surface blemishes and contaminants. From the prior art, it is known that several cleaning procedures can be made to yield satisfactory results but one cleaning procedure which has been found to be very effective and satisfactory is to first "de-grease" the mirror blank by dissolving the grease on its surface with alcohol or trichloroethylene. Next, a solution of calcium carbonate (precipitated chalk) is placed on the mirror blank surface and thoroughly rubbed in by hand until all surface blemishes have been removed. The mirror blank is then put in a 10% solution of nitric acid for a period of approximately twenty-four hours thus permitting all the carbon containing material to be oxidized by the acid. After the nitric acid cleaning step, the mirror blank is rinsed in distilled water and dried either with a grease free cloth or by any other suitable method whereby the surface is left absolutely dry, clean and free of any surface contaminants or blemishes. When cleaned in this manner, the blank is ready to receive the reflective coating.

The coating of this invention is applied to the mirror blank surface by the technique known as the evaporation method. The evaporation method has been known for a number of years and, for a discussion of this method, reference is made to the book on Procedures in Experimental Physics by Strong. Discussing the evaporation method very briefly, in producing thin films on glass, quartz and other material, the coating material is simply heated in a high vacuum until its vapor pressure exceeds that of the vacuum whereupon it emits molecular rays in all directions. The degree of vacuum required for successfully carrying out the process is such that the mean free path of the molecules is larger than the diameter of the vacuum container. Therefore, molecular rays propagate from their source without disturbance until they impinge upon the walls of the vacuum or some object within them. The mirror surface to be coated is exposed to these molecular rays which then condense on it to form the desired film or coating.

The apparatus used in this evaporation method is similar to that disclosed in Patent No. 2,398,382 to Lyon and consequently, no claim is made to the evaporation apparatus per se. The coating alloy of this invention, comprised of a mixture of aluminum and beryllium, is placed in a tungsten boat connected between two electrodes. It has been discovered that a reflective coating in its most desirable form is produced when the initial mixture consists of 90% by weight of aluminum and 10% by weight of beryllium but it has also been found that very satisfactory coatings are produced when the beryllium is present in the range from 6% to 25% by weight in the initial mixture. When the beryllium is initially present in the amount of 10% by weight, experiments show that the reflectivity of the coating produced is equivalent to that of aluminum in all normally used ranges of the visible frequency spectrum, that is, a light reflective efficiency of 87% to 89% over the range from 3600–6500 Angstrom units. The coating is very hard, durable and able to withstand such abuse as use in the field equipment and repeated and vigorous rubbing with a cloth without its light reflective efficiency being impaired. However, experiments also show that as the percentage of beryllium initially in the mixture decreases to approximately 6% by weight, the coating produced begins to lose its hard and durable qualities and further, that as the initial amount of beryllium increases to approximately 25% by weight, the light reflective efficiency of the coating is lowered to approximately 80% which is the lower useful reflectivity limit of front surface coated mirrors for many applications.

After the aluminum and beryllium mixture is placed in the tungsten boat, the mirror blank to be coated is suspended by a structure supported from the base of the evaporating apparatus and a bell jar provided with a suitable gasket around its lower circumference lowered into position on the base thereby enclosing the electrode and mirror support structure. Vacuum pumps then operate to produce a vacuum within the bell jar of from $8 \times 10^{-5}$ to $2 \times 10^{-5}$ millimeters of mercury which, for the purposes of this invention, has been found to be adequate. A current is then applied to the electrodes which evaporates the aluminum and beryllium alloy onto the metal blank thus producing the hard, durable and abrasion-resistant but highly efficient reflective coating of this invention. Due to its greater vapor pressure, the initial fraction evaporated onto the mirror blank is composed of a larger percentage of beryllium than aluminum but, as the coating process proceeds, the fraction evaporated contains larger and larger percentages of aluminum. Therefore, it can be seen that the unique coating of this invention is comprised of an aluminum alloy in which the percentage of beryllium constantly decreases as the coating is applied to a mirror blank.

This invention has been described in terms of a specific method and means for producing reflective coatings for front surface coated mirrors. However, while this is one intent of the invention, it is also intended to claim any use of a hard, durable and abrasion-resistant but efficient reflective mirror coating comprised of aluminum and beryllium as within the scope of this invention.

I claim:

1. A single batch method of manufacturing mirrors with a luminous reflectance of 87% to 89% comprising the steps of preparing a mixture of 90% by weight of aluminum and 10% by weight of beryllium, heating said mixture in a vacuum of about $8 \times 10^{-5}$ to $2 \times 10^{-5}$ millimeters of mercury to melt the aluminum and beryllium together and thereafter produce vapors therefrom, said vapors being initially composed principally of beryllium, exposing a clean, smooth surface to said vapors initially composed principally of beryllium, continuing heating said molten aluminum and beryllium until said vapors produced therefrom are composed principally of aluminum and only in a negligible proportion of beryllium, and condensing on said surface said vapors produced to obtain a hard, durable and abrasion-resistant coating with a high efficiency of luminous reflectance.

2. A single batch method of manufacturing mirrors with a luminous reflectance of 80% to 89% comprising the steps of preparing a mixture of about 75% to 94% by weight of aluminum and about 6% to 25% by weight of beryllium, heating said mixture in a vacuum of about $8 \times 10^{-5}$ to $2 \times 10^{-5}$ millimeters of mercury to melt the aluminum and beryllium together and thereafter produce vapors therefrom, said vapors being initially composed principally of beryllium, exposing a clean, smooth surface to said vapors initially composed principally of beryllium, continuing heating said molten aluminum and beryllium until said vapors produced therefrom are composed principally of aluminum and only in a negligible proportion of beryllium, and condensing on said surface said vapors produced to obtain thereby a hard, durable and abrasion-resistant coating with a high efficiency of luminous reflectance.

References Cited in the file of this patent

UNITED STATES PATENTS

| | | |
|---|---|---|
| 2,410,733 | Hewlett | Nov. 5, 1946 |
| 2,724,663 | Bond | Nov. 22, 1955 |